United States Patent Office 2,861,967
Patented Nov. 25, 1958

2,861,967

FLAMEPROOF MASTIC COMPOSITION CONTAINING ISOBUTYLENE POLYMER

Wayne P. Ellis, Springfield, Pa., and Leo I. Smith, Camden, and Irvin J. Steltz, Collingswood, N. J., assignors to Benjamin Foster Company, Philadelphia, Pa., a corporation of Delaware No Drawing. Application August 21, 1957
Serial No. 679,514

4 Claims. (Cl. 260—28.5)

This invention relates to a mastic and more particularly to a protective coating material for application to the exposed surface of thermal insulation such as molded insulating blocks and slabs, for example. This application is a continuation-in-part of our copending application Serial No. 311,548, filed September 25, 1952.

Industrial plants such as chemical processing plants and the like often have processing equipment that is not protected from the weather. Some of this equipment is designed to handle materials at high or low temperatures and therefore requires insulation. Such equipment is frequently insulated with 85% magnesia block, fiber glass, foam glass, mineral wool or vegetable cork board, for example, such insulation ordinarily being applied to the processing equipment in the form of slabs or blocks. Molded insulation of this character has very little resistance to the elements and must be provided with a protective covering.

It is one object of this invention to provide an improved protective covering for thermal insulation of the character indicated above.

Since in many instances the insulation is applied to heated equipment it is very important that the protective coating be resistant to heat. Moreover the temperature of the insulation often varies and as a result the protective coating is required to expand and contract without deteriorating. Since the efficiency of many insulating materials is seriously reduced by water and water-vapor in the material, the protective coating should also form a water-vapor barrier at the surface of the insulation. Moreover a protective coating for uses of this kind should preferably have fire retardant properties.

Mastics have already been used for service of this kind, but they have not been entirely satisfactory principally because of their poor heat resistance. In a relatively short period of time they tend to become hard and brittle and ultimately crack and peel off the surface of the insulation. Moreover they have been relatively poor fire retardants as well.

It is accordingly another object of this invention to provide a protective coating for thermal insulation which overcomes the foregoing disadvantages. Other objects and advantages of this invention will further become apparent hereinafter.

The composition of this invention consists essentially of a vehicle component and a pigment component. The vehicle component consists essentially of (1) an isobutylene polymer or co-polymer such as an isobutylene styrene co-polymer, (2) a plasticizer for said polymer or co-polymer consisting of a petroleum fraction condensation product obtained from a paraffin base crude oil residue and (3) a resinous fire-retardant chlorinated paraffin. The pigment component preferably consists of mineral thickeners such as mica, asbestine and short asbestos fibers, a thickening agent such as Bentone 18 which is an organic derivative of montmorillonite and a ketone such as a methyl iso butyl ketone. The vehicle component is preferably dissolved in a solvent such as xylol or the like which serves as a diluent to liquify the composition containing the vehicle and pigment components. The solvent evaporates after the mastic has been applied to the molded insulation.

The isobutylene polymers covered by this invention are the polymers of isobutylene, including the isobutylene-styrene polymers, isobutylene-isoprene co-polymers, and polyisobutylene.

The polyisobutylene has a molecular weight in the range of 30,000 to 90,000. Below a molecular weight of 30,000 the material is too sticky, low in viscosity and has an undesirable cold flow. The long-chain polymer is preferred with limited unsaturation, making it relatively inert and providing the desired elastomeric property. Polyisobutylene polymers with molecular weights closer to 90,000 have the elasticity and rubbery properties required of coatings subject to the temperature changes.

The isobutylene-isoprene co-polymer, Butyl rubber, contains 1 to 10% by weight isoprene. It varies from a water-white to amber solid. Butyl rubber is chemically unlike natural or other synthetic rubbers; the unsaturation is only about 3% of the unsaturation of natural rubber.

Isobutylene-styrene co-polymers are thermoplastic and resinous. This co-polymer is the result of a low temperature polymerization of a mixture of isobutylene and styrene, with a molecular weight range of 10,000 to 100,000. For purpose of this invention it is preferred that the isobutylene be in the weight proportion of about 30 to 70%, balance styrene. If the weight proportion of styrene is much greater than 70%, the co-polymer tends to be too hard and to have undesirable properties.

The plasticizer which coacts with the isobutylene-styrene co-polymer is selected from a specific series of paraffin petroleum fraction condensation products known commercially as the Kendex series. These materials are to be distinguished sharply from products derived from the aromatic base hydrocarbons, as they are derivatives of paraffin base crude oil. The paraffin petroleum fraction derivative is a chemical condensation product derived from a naturally contained high molecular weight viscous material precipitated from a warm propane solution of a residual paraffin base oil fraction which has undergone no thermal decomposition or chemical change beyond that induced by ordinary fractional distillation. It is produced essentially by the air blowing, at controlled rates, of the source materials. The chemical condensation product has an iodine number not substantially above 40, a ball and ring softening point above 110° F. and ranging up to 200° F., an average molecular weight of at least 1900, at least 40 carbon atoms per double bond, and a marked reduction in susceptibility to penetration with temperature change in the range of from 30–60° F. It is substantially completely soluble in 88° Baumé naphtha and is virtually free of any asphaltenes. Methods of making this condensation product are disclosed more fully in the U. S. patent to McClure et al., No. 2,337,336, granted December 21, 1943, the disclosure of which is incorporated herein by reference.

Examples of specific commercial plasticizers are as follows:

| Kendex Number | Softening Point, ° F. (ASTM E23–42T) | Needle Penetration at 77° F. (ASTM D5-25) | Resin Stain Test Number | Temperature, ° F. for 890 Cps. Viscosity |
|---|---|---|---|---|
| 1430 | 120/140 | 192 | | 313 |
| 2430 | 150/170 | 96 | 2 | 359 |
| 3430 | 180/200 | 69 | 2 | 386 |

The solvent for the isobutylene polymer and the paraffin base petroleum fraction may be selected from a wide range of organic solvents. The specific nature of the solvent is not of great importance and the solvent evaporates after the mastic is installed and does not become a part of the finished mastic coating. Among highly acceptable solvents are mineral spirits, xylol, methyl isobutyl ketone and the like.

The resinous flame-retardant is a chlorinated paraffin. One excellent flame retardant which is compatible with the other ingredients of the vehicle component is a composition selected from the series of flame retardants known commercially as the chlorowax series. Chlorowax 70 is a white, pulverized, chlorinated, resinous paraffin having a specific gravity of about 1.64 and a melting point of about 90° C. Chlorowax is insoluble in water, soluble in hydrocarbons, ketones, esters, nitroparaffins and chlorinated hydrocarbons. It does not oxidize, polymerize or condense and decomposes at 135° C. with evolution of hydrogen chloride. In the presence of calcium carbonate decomposition is controlled and the reaction products ($CO_2$ and $CaCl_2$) act as flame retardants. One specific chlorowax which we have found particularly desirable contains about 70% chlorinated hydrocarbons. Suitable chlorowaxes have a combined chlorine content of about 55–75% by weight, balance paraffin.

Turning now to the pigment component of the composition, this component preferably consists essentially of fibrous and non-fibrous fillers. Among the non-fibrous fillers are micaceous talc and antimony oxide. Another suitable non-fibrous filler is ground vegetable cork. Antimony oxide is preferably added since it coacts with the chlorowax in the vehicle component to complement the fire retarding action of the chlorowax. The fibrous filler preferably consists of asbestine (fibrous magnesium silicate) and asbestos which forms a fibrous mat which holds together the other components of the mastic. One grade of asbestos which is preferred for use with this invention is Canadian 7R which has a maximum fiber length of about one sixteenth inch. However asbestos up to Canadian 5R, which has a maximum fiber length of about one quarter inch, may be utilized in accordance with this invention. Fibers longer than this are not utilized in compositions that are to be applied by spraying since the longer fibers tend to clog the spraying equipment. Fibers longer than one quarter inch also trowel with difficulty. Fibers much shorter than one sixteenth inch are quite suitable for this invention and asbestos having fibers as short as one thirty-second inch fall within the scope of this invention.

In general, the particle sizes of the non-fibrous ingredients of the pigment generally are not critical but for spraying purposes they should be below one thirty-second inch in order to avoid clogging the spray gun.

The thickening agent or gelling agent is preferably in the form of an organic derivative of montmorillonite, which is a hydrous aluminum silicate having an expanding lattice. The product known commercially as Bentone 18 (National Lead Company) is a finely divided powder of which less than 5% is retained on a standard No. 200 sieve. It has an apparent density of about 3.5 lbs./gal.

The proportions of ingredients of our composition may be varied substantially but should be restricted within certain critical limits. In the vehicle component, the isobutylene polymer preferably consists of about 20–40% by weight of the total solids in the vehicle component, resinous chlorinated paraffin flame retardant 10–35% by weight, and paraffin base petroleum distillation residue about 20–60% by weight.

In the pigment component the proportions are not critical and the relative amounts of ingredients can vary considerably. However preferably the asbestine should be present on the order of about 35–50% of the total pigment, micaceous talc about 5–15%, asbestos about 30–45% and antimony oxide about 5–15%.

The vehicle may if desired be used without any pigment in it, but pigment is preferably added up to about 50% of the total weight of pigment plus vehicle. Therefore the composition preferably consists of about 50–100% vehicle and the balance pigment but the pigment proportion is preferably about 10–50% with the balance vehicle component. The solvent is not included in the above figures as it comprises diluent which serves to liquify all the above ingredients of the vehicle and pigment components.

The compositions of this invention are preferably prepared by dissolving the isobutylene polymer in the solvent, adding the chlorowax and paraffin base petroleum residue condensation product, and then adding the pigment component. The composition may be compounded in other ways if found desirable.

The mastic composition may be applied to the work either by spraying or troweling for example. If the mastic is to be applied to conventional 85% magnesia molded insulation a spray primer is first applied to the insulation to lay the dust that is usually present on the block. A wire netting such as poultry wire, for example, is then stretched over the exposed surface of the insulation and secured in position and the mastic is then applied to the insulation and netting. The mastic is thereby keyed into the netting and the netting permanently holds the mastic structure in place. For use on some kinds of insulation it is not necessary to apply a primer but in any event it is desirable to utilize wire netting, woven fibrous glass, or the like as heretofore described.

The following are specific examples of compositions ideally suited for use in accordance with this invention.

*Example 1*

The following composition is particularly adapted for troweling rather than spraying and consists essentially of following ingredients in the indicated proportions by weight:

| Material: | Percent by weight |
|---|---|
| Isobutylene-styrene co-polymer | 11 |
| Mineral spirits | 30 |
| Xylol | 17 |
| Chlorowax 70 | 11 |
| Kendex 1430 (softening point 120° F. to 140° F.) | 11 |
| Asbestine (99% through 325-mesh) | 8 |
| Micaceous talc | 3 |
| Asbestos fiber (Canadian 7R) | 6 |
| Antimony oxide | 2 |
| Bentone 18 | ½ |
| Denatured alcohol | ½ |

The Bentone 18 and the denatured alcohol are added to control the flow of the mastic during its application to the insulation. They may be present in an amount ranging from 0–2% by weight of the total.

*Example 2*

| Material: | Percent by weight |
|---|---|
| Isobutylene-styrene co-polymer | 15 |
| Mineral spirits | 10 |
| Xylol | 35 |
| Kendex 1430 | 15 |
| Chlorowax 55 (55% by weight combined chlorine) | 15 |
| Asbestine | 4 |
| Asbestos fiber | 5 |
| Bentone 18 | ½ |
| Denatured alcohol | ½ |

The following composition is ideally adapted for application by spraying rather than troweling and consists essentially of the following ingredients in the indicated proportions:

Example 3

| Material: | Percent by weight |
|---|---|
| Isobutylene-styrene co-polymer S–60 (Enjay Co., N. Y.) | 7 |
| Mineral spirits | 32 |
| Methyl iso-butyl ketone | 15 |
| Chlorowax 60 (60% by weight combined chlorine) | 12 |
| Kendex 1430 | 14 |
| China clay | 14 |
| Asbestos fibers (short) | 5 |
| Bentone 18 | ½ |
| Denatured alcohol | ½ |

Example 4

| Material: | Percent by weight |
|---|---|
| Isobutylene-styrene co-polymer S–60 | 15 |
| Mineral spirits | 18 |
| Xylol | 31 |
| Kendex 1430 | 10 |
| Chlorowax 65 (65% by weight combined chlorine) | 15 |
| Asbestos fiber | 5 |
| Asbestine | 5 |
| Denatured alcohol | ½ |
| Bentone 18 | ½ |

Example 5

| Material: | Percent by weight |
|---|---|
| Isobutylene-styrene co-polymer S–60 | 12 |
| Mineral spirits | 31 |
| Xylol | 18 |
| Chlorowax 70 | 11 |
| Kendex 1430 | 12 |
| Asbestine | 10 |
| Asbestos fiber | 5 |
| Bentone 18 | ½ |
| Denatured alcohol | ½ |

Example 6

| Material: | Percent by weight |
|---|---|
| Isobutylene-styrene co-polymer S–60 | 11 |
| Mineral spirits | 26 |
| Xylol | 17 |
| Chlorowax 70 | 11 |
| Kendex 1430 | 11 |
| Asbestine | 8 |
| Micaceous talc | 3 |
| Asbestos fiber | 6 |
| Antimony oxide | 2 |
| Denatured alcohol | 5 |

Example 7

In lieu of the denatured alcohol in Example 6, water and a wetting agent may be substituted to control the flow of mastic during its application. Suitable wetting agents are the alkyl aryl polyether alcohols such as those of the Triton series and the wetting agents of the Aerosol series such as dioctyl sodium sulfosuccinate, for example. These or other wetting agents readily selected by one skilled in the art are preferably employed in amounts equal to about ½% of the total mastic composition.

Example 8

| Material: | Percent by weight |
|---|---|
| Isobutylene-styrene co-polymer S–60 | 15 |
| Mineral spirits | 18 |
| Xylol | 30 |
| Kendex 3430 (softening point 180° to 200° F.) | 15 |
| Chlorowax 75 (75% by weight combined chlorine) | 20 |
| Bentone 18 | 1 |
| Denatured alcohol | 1 |

The above composition is free of any pigment component and has a paint-like consistency. It forms a very thin mastic coating and this is very desirable for some purposes.

Example 9

| Material: | Percent by weight |
|---|---|
| Isobutylene-isoprene co-polymer (butyl rubber) | 15 |
| Mineral spirits | 17 |
| Xylol | 37 |
| Kendex 3430 (instead of 1430) | 10 |
| Chlorowax 70 | 15 |
| Asbestos fiber | 5 |
| Bentone 18 | ½ |
| Denatured alcohol | ½ |

Example 10

| Material: | Percent by weight |
|---|---|
| Isobutylene polymer | 11 |
| Mineral spirits | 26 |
| Xylol | 17 |
| Chlorowax 70 | 11 |
| Kendex 2430 (softening point 150–170° F.) | 12 |
| Asbestine | 10 |
| Asbestos fiber | 5 |
| Bentone 18 | ½ |
| Denatured alcohol | ½ |

It is essential in the practice of this invention to combine the isobutylene polymer with the paraffin base petroleum distillation residue condensation product. The latter, if used without the former, would provide a mastic that is too soft and sticky; the mastic would run and sag badly when exposed to the sun. It would also smear off under these conditions. On the other hand, the isobutylene polymer if used without the paraffin residue condensation product would provide a mastic that is too hard and too brittle particularly in cold weather. The mastic would would have poor heat resistance, and any appreciable expansion or contraction of the underlying vessel or processing equipment would crack the mastic. Only with the specific combination disclosed and claimed herein is a mastic provided that has the optimum combination of toughness, flexibility and hardness for most weather conditions and insulation temperature conditions.

The resinous chlorinated paraffin contributes a fire retardant property to the composition as well as imparts a property to other binders which inhibits their absorption by insulating materials such as 85% magnesia, glass wool and the like. The absorption by insulation materials may be inhibited by increasing the recommended weight proportion of isobutylene-polymers or co-polymers but this would introduce undesirable properties such as a viscosity and texture difficult to apply, failure to release solvent in a reasonable time and would produce a combustible coating. Increasing the plasticizer above the recommended weight proportion would not inhibit the absorption by the insulating material as much, and would produce a coating that remains tacky longer than desired. The absorption of the mastic by insulating materials can be minimized by increasing the filler content above that recommended by this invention, but this would render the mastic less impermeable and inhibit the weathering property of the mastic. An increase in filler content would also introduce difficulty in spray application of coating. While in the absence of the resinous chlorinated paraffin the material tends to penetrate into glass wool, magnesia, or other similar base materials, and to be absorbed thereby, the mixture in accordance with this invention does not penetrate to any substantial extent, but instead forms a layer on the surface of the base material. This is a very useful and advantageous property.

Having thus described our invention, we claim:

1. A mastic composition containing as its essential ingredients, in substantially the weight proportions indicated: 20 to 40% polymerized isobutylene selected from the group consisting of the isobutylene-styrene copolymers having about 30–70% by weight isobutylene and the balance styrene, polyisobutylene having a molecular weight in the range of about 30,000 to 90,000, and isobutylene-isoprene copolymers having about 1 to 10% by weight isoprene and the balance isobutylene, 20 to 60% paraffin base petroleum distillation residue condensation product derived from a naturally contained high molecular weight viscous material precipitated from a warm propane solution of a residual paraffin base oil fraction which has undergone no thermal decomposition or chemical change beyond that induced by ordinary fractional distillation, said chemical condensation product having an iodine number not substantially above 40, a ball and ring softening point above 110° F. and ranging up to 200° F., an average molecular weight of at least 1900, at least 40 carbon atoms per double bond, and a marked reduction in susceptibility to penetration with temperature change in the range of from 30 to 60° F., and being substantially completely soluble in 88° Baumé naphtha and virtually free of asphaltenes, and 10 to 35% resinous chlorinated paraffin flame retardant.

2. The mastic composition defined in claim 1, wherein the resinous chlorinated flame retardant has a specific gravity of about 1.64 and a melting point of about 90° C.

3. The mastic composition defined in claim 1, wherein asbestine and asbestos fibers having an average length of 1/32 to 1/4 inch are incorporated into the composition.

4. The mastic composition defined in claim 1, wherein about 10%–50% by weight of pigment component is added, such pigment component consisting essentially of about 40%–65% by weight filler selected from the group consisting of asbestine and talc, 30–45% by weight asbestos fibers, and about 5–15% by weight antimony oxide.

No references cited.